(12) United States Patent
Lee

(10) Patent No.: US 8,845,153 B2
(45) Date of Patent: Sep. 30, 2014

(54) HIGH BEAM AND LOW BEAM COMBINATION LAMP FOR A BICYCLE

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 16 days.

(21) Appl. No.: 13/760,073

(22) Filed: Feb. 6, 2013

(65) Prior Publication Data

US 2014/0218948 A1    Aug. 7, 2014

(51) Int. Cl.
*B62J 6/02* (2006.01)
*B62J 6/00* (2006.01)

(52) U.S. Cl.
CPC .......................................... *B62J 6/00* (2013.01)
USPC ............ 362/473; 362/475; 362/509; 362/545

(58) Field of Classification Search
CPC .......................... F21S 48/1159; F21V 29/2206
USPC .......................................... 362/473, 475, 509
See application file for complete search history.

(56) References Cited

U.S. PATENT DOCUMENTS

| | | | |
|---|---|---|---|
| 6,017,140 A * | 1/2000 | Chou ............................. | 362/475 |
| 6,520,669 B1 * | 2/2003 | Chen et al. .................... | 362/545 |
| 7,237,936 B1 * | 7/2007 | Gibson ......................... | 362/547 |
| 7,686,488 B2 * | 3/2010 | Inoue et al. ................... | 362/509 |
| 7,922,377 B2 * | 4/2011 | Yamamichi et al. .......... | 362/545 |
| 8,038,334 B2 * | 10/2011 | Ishida .......................... | 362/539 |

* cited by examiner

*Primary Examiner* — Anabel Ton

(57) ABSTRACT

A high beam and low beam combination lamp for a bicycle includes a main body, a lens, a downward light source and a straight light source, the main body having a receiving space defined thereon, the receiving space having a first surface and a second surface formed therein, the lens being assembled in the receiving space and corresponding to the second surface, the downward light source being assembled with the first surface, parts of the light beam of the downward light source obliquely passing through the receiving space so as to form a low beam lighting region, the straight light source being assembled with the second surface, the light beam of the straight light source passing through the lens so as to form a high beam lighting region.

8 Claims, 15 Drawing Sheets

HIGH BEAM AND LOW BEAM COMBINATION LAMP FOR A BICYCLE

BACKGROUND OF THE INVENTION

1. Field of the Invention

The present invention relates to a lamp for a bicycle, and more particularly to a high beam and low beam combination lamp for a bicycle.

2. Description of Related Art

Bicycle lamp, in particular, being assembled at a front part of a bicycle, is a necessary apparatus for a bicycle when riding the bicycle in the night and gives the rider more safety and also protects passerby's safety. A conventional bicycle lamp can provide a high beam or a low beam selectively. The high beam could be transmitted ahead to warn the passerby; while the low beam could light on the road surface at the front of the bicycle. Therefore, a high-low beam function for the bicycle lamp is important.

A conventional high-low beam combination lamp for a bicycle comprises a light, a reflector and a lens. For performing the high-low beam function for the conventional high-low beam combination lamp for a bicycle, a user adjusts a distance between the light and the reflector or another distance between the light and the lens, so that the conventional high-low beam combination lamp for a bicycle lights on the road at near field or the road at far field optionally.

However, the conventional high-low beam combination lamp for a bicycle has two disadvantages as following: Firstly, the structure of the conventional high-low beam combination lamp for a bicycle is complicated and damageable under long-term repeating operation; secondly, when riding the bicycle on a rough road, the distance between the light and the reflector or another distance between the light and the lens shifts easily because of a violent vibration, so that the conventional high-low beam combination lamp for a bicycle fails to provide a suitable lighting condition; as a result, the conventional high-low beam combination lamp for a bicycle is inconvenient to be used.

The present invention has arisen to mitigate and/or obviate the disadvantages of the conventional.

SUMMARY OF THE INVENTION

The main objective of the present invention is to provide a high beam and low beam combination lamp for a bicycle.

To achieve the objective, a high beam and low beam combination lamp for a bicycle comprises a main body, a lens, a downward light source and a straight light source, the main body having a receiving space defined at one end thereof, the receiving space having a first surface and a second surface formed therein, the lens being assembled in the receiving space and corresponding to the second surface, the downward light source being assembled with the first surface of the receiving space, parts of the light beam of the downward light source obliquely passing through the receiving space so as to form a low beam lighting region, the straight light source being assembled with the second surface, the light beam of the straight light source passing through the lens so as to form a high beam lighting region. Wherein, the lens is optionally selected as a plano-convex lens, a double convex lens or a Fresnel lens; the lens is a TIR lens; the receiving space has a reflecting plane assembled therein; the reflecting plane corresponds to the downward light source; other parts of the light beam of the downward light source are reflected by the reflecting plane and pass through the receiving space so as to form a low beam lighting region; the TIR lens further has a flat plane formed thereon; the receiving space has a third surface defined therein; the flat plane is assembled with the third surface; the angle between the first surface and the second surface is 270 degrees; the angle between the second surface and the third surface is 90 degrees; the downward light source and the straight light source are light-emitting diodes; an angle is defined between the first surface and the second surface; the angle defined between the first surface and the second surface is optionally selected as 90 degrees or 270 degrees.

Further benefits and advantages of the present invention will become apparent after a careful reading of the detailed description with appropriate reference to the accompanying drawings.

DETAILED DESCRIPTION OF THE INVENTION

Figure 1:
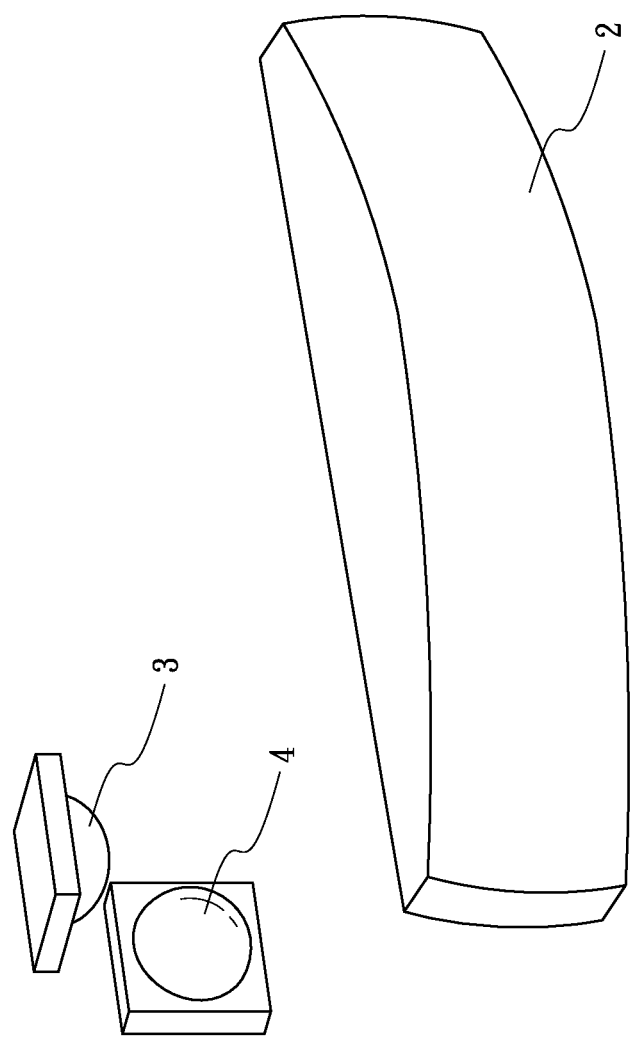
FIG. 1 is a perspective view of a high beam and low beam combination lamp for a bicycle of the present invention.
Figure 2:
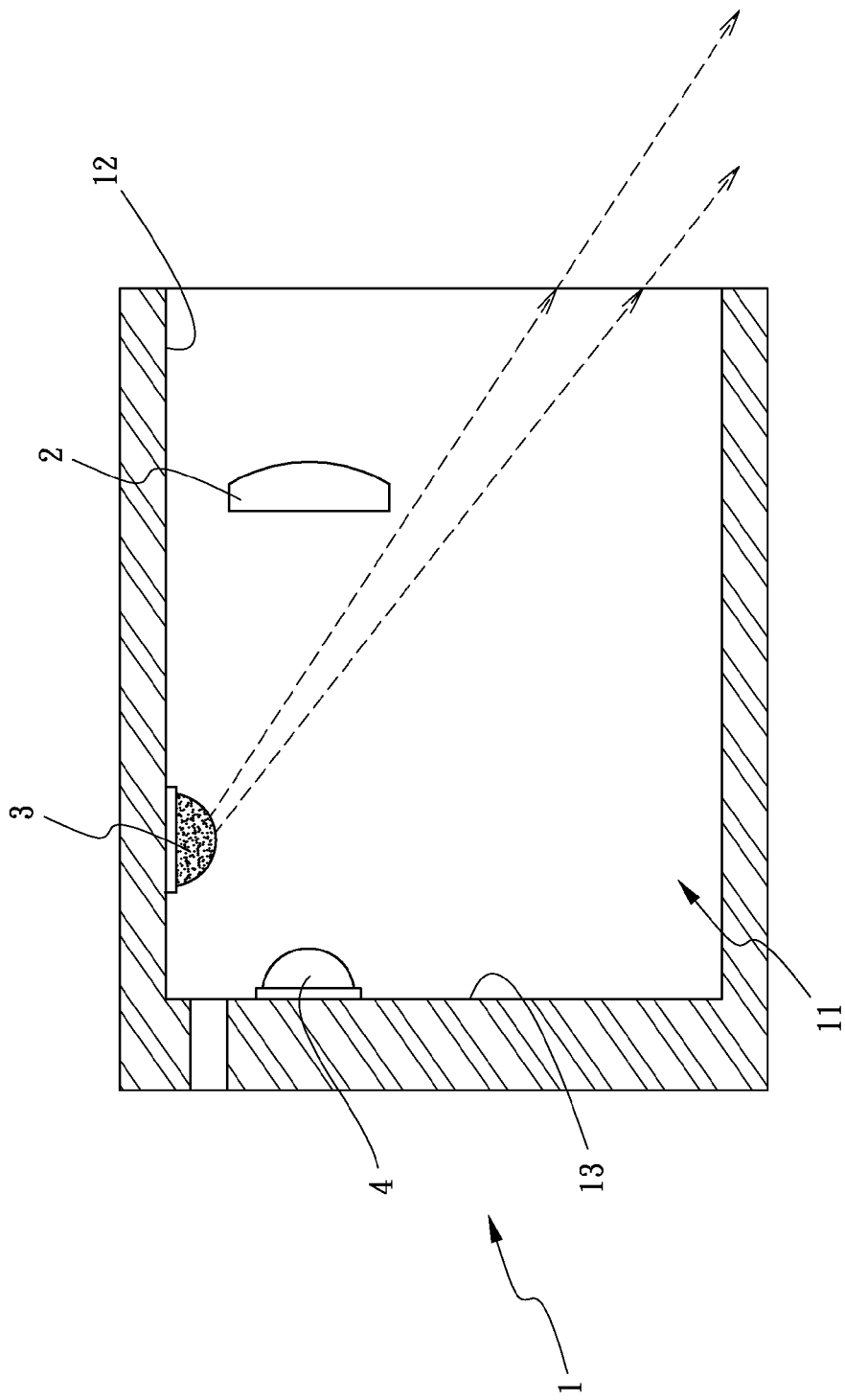
FIG. 2 is an embodied view of the high beam and low beam combination lamp for a bicycle for showing a low beam condition.
Figure 3:
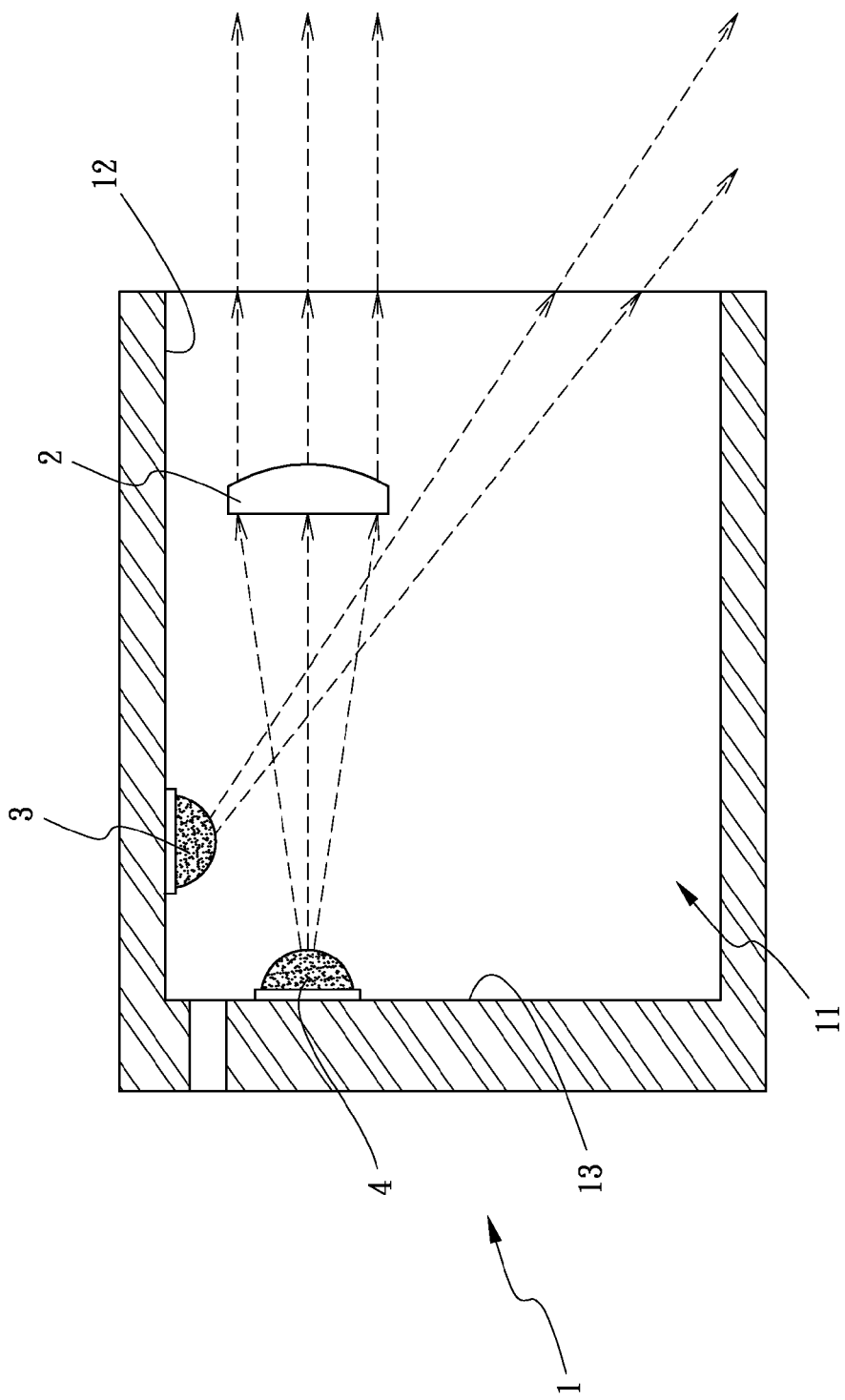
FIG. 3 is an embodied view of the high beam and low beam combination lamp for a bicycle for showing a high beam condition.

Referring to FIGS. 1-3, a high beam and low beam combination lamp for a bicycle in accordance with the present invention comprises a main body 1, a lens 2, a downward light source 3 and a straight light source 4. The main body 1 has a receiving space 11 defined at one end thereof. The receiving space 11 has a first surface 12 and a second surface 13 formed therein. The lens 2 is assembled in the receiving space 11 and corresponding to the second surface 13. In a preferred embodiment, the lens 2 is a plano-convex lens. The downward light source 3 is assembled with the first surface 12 of the receiving space 11. Parts of the light beam of the downward light source 3 obliquely pass through the receiving space 11 so as to form a low beam lighting region. The straight light source 4 is assembled with the second surface 13. The light beam of the straight light source 4 passes through the lens 2 so as to form a high beam lighting region. The downward light source 3 and the straight light source 4 are light-emitting diodes (LEDs).

As shown by the dashed lines and the arrows in FIG. 2, when a low beam condition of the present invention is provided, parts of the light beam of the downward light source 3 obliquely pass through the receiving space 11; while as shown in FIG. 3, when a high beam condition of the present invention is provided, not only parts of the light beam of the downward light source 3 obliquely pass through the receiving space 11, but also the light beam of the straight light source 4 passes through the lens 2. Therefore, a rider operates the present invention in a low beam condition or in a high beam condition selectively according to the practical road conditions.

Referring to FIG. 3, when the high beam condition of the present invention is provided, the downward light source 3 still projects the low beam lighting region; in other words, the low beam lighting region does not disappear when the present invention is in the high beam condition, so that the rider checks the road conditions in time so as to prevent from a bike accident occurring.

Other embodiments of the present invention are briefed and listed as following, only the differences different form the embodiment mentioned above are elucidated.

Figure 4:
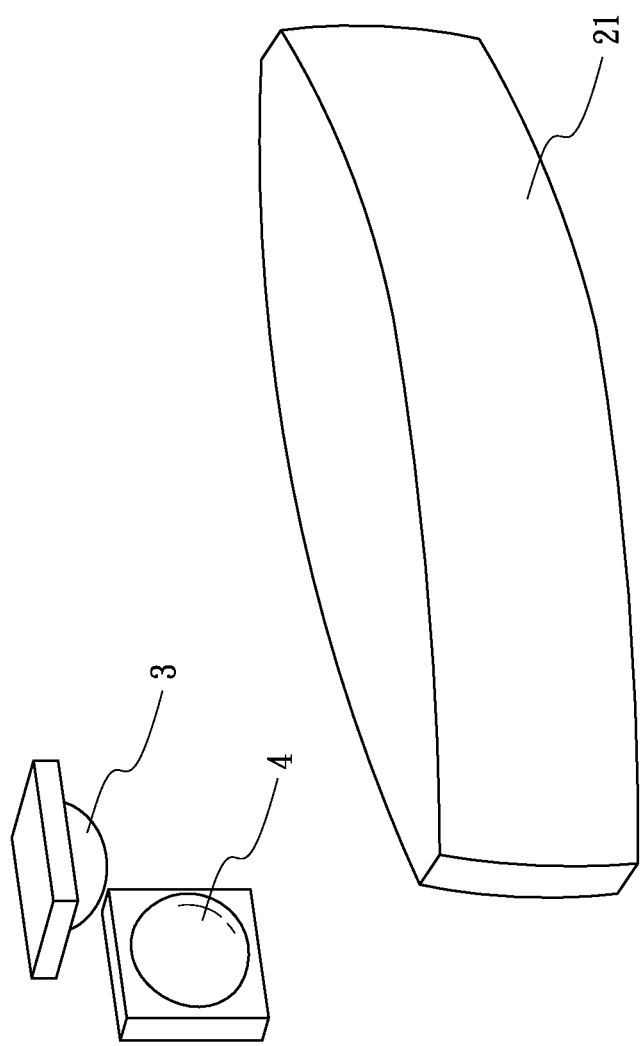
FIG. 4 is a perspective view of one embodiment of the present invention in which the lens is a double convex lens.
Figure 5:
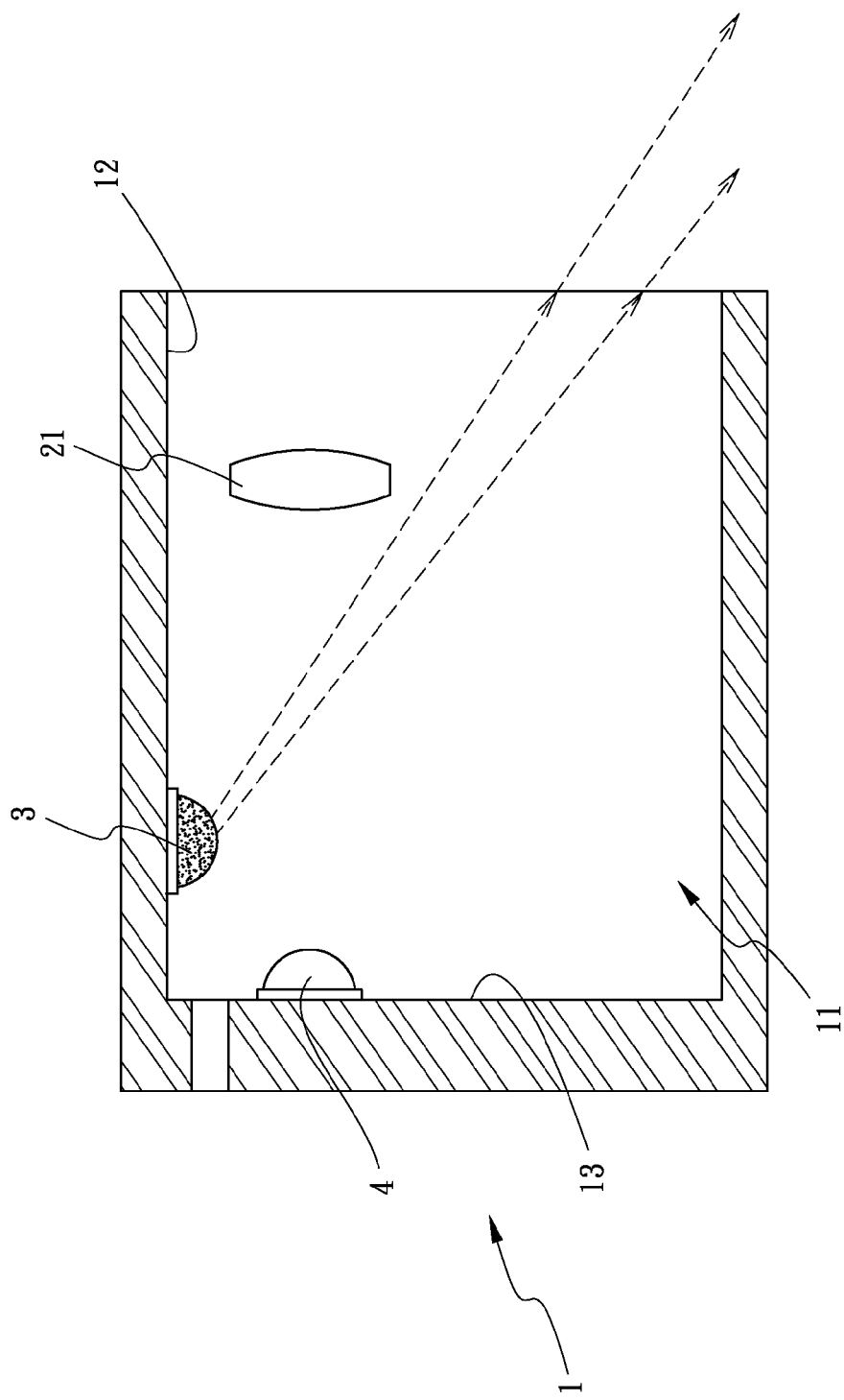
FIG. 5 is an embodied view of one embodiment of the present invention for showing a low beam condition.
Figure 6:
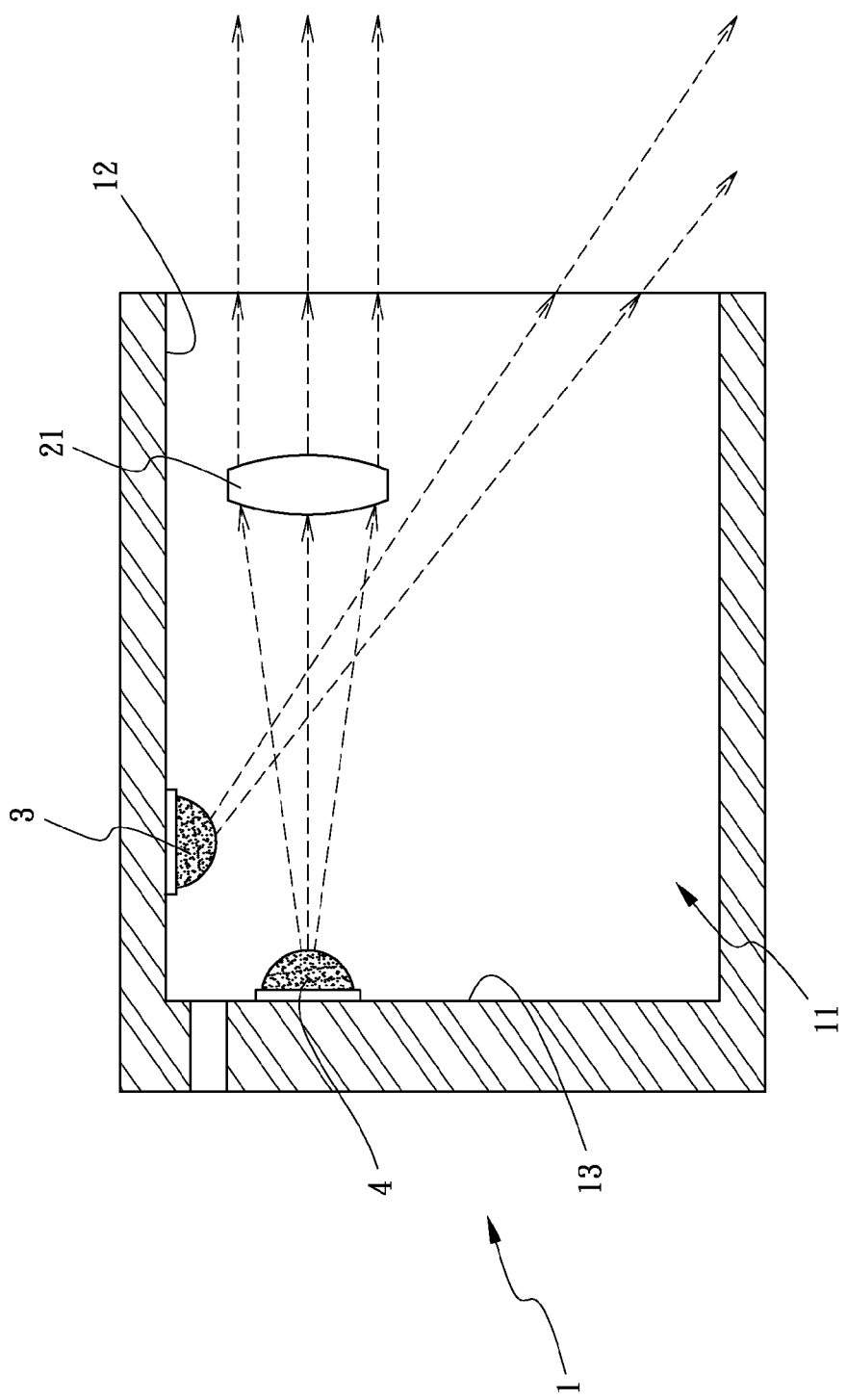
FIG. 6 is an embodied view of one embodiment of the present invention for showing a high beam condition.

1. As shown in FIGS. 4-6, one embodiment of the present invention, the lens 2 is a double convex lens 21.

Figure 7:
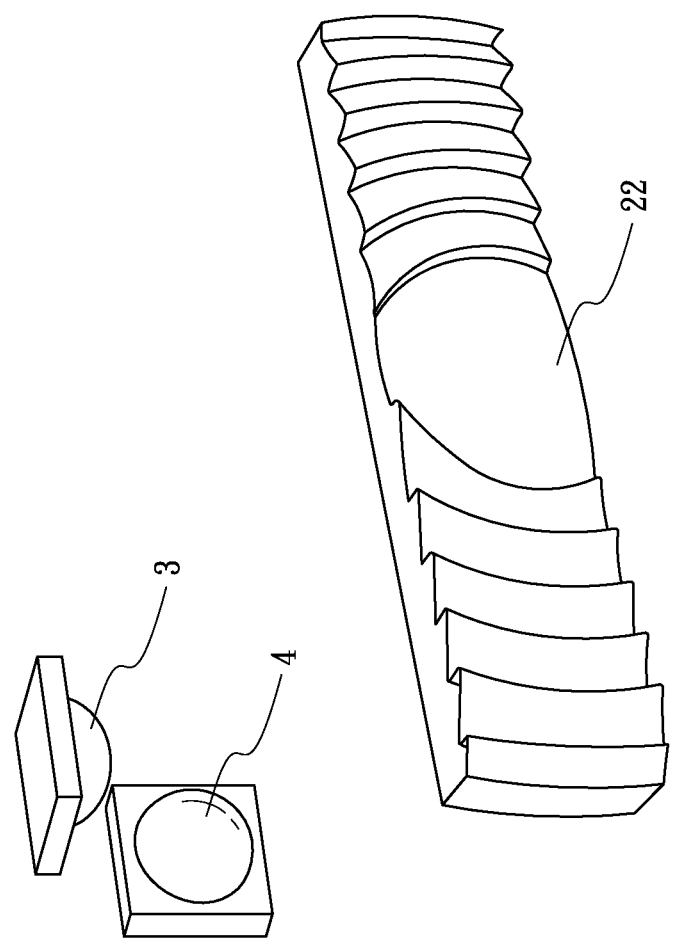
FIG. 7 is a perspective view of another embodiment of the present invention in which the lens is a Fresnel lens.
Figure 8:
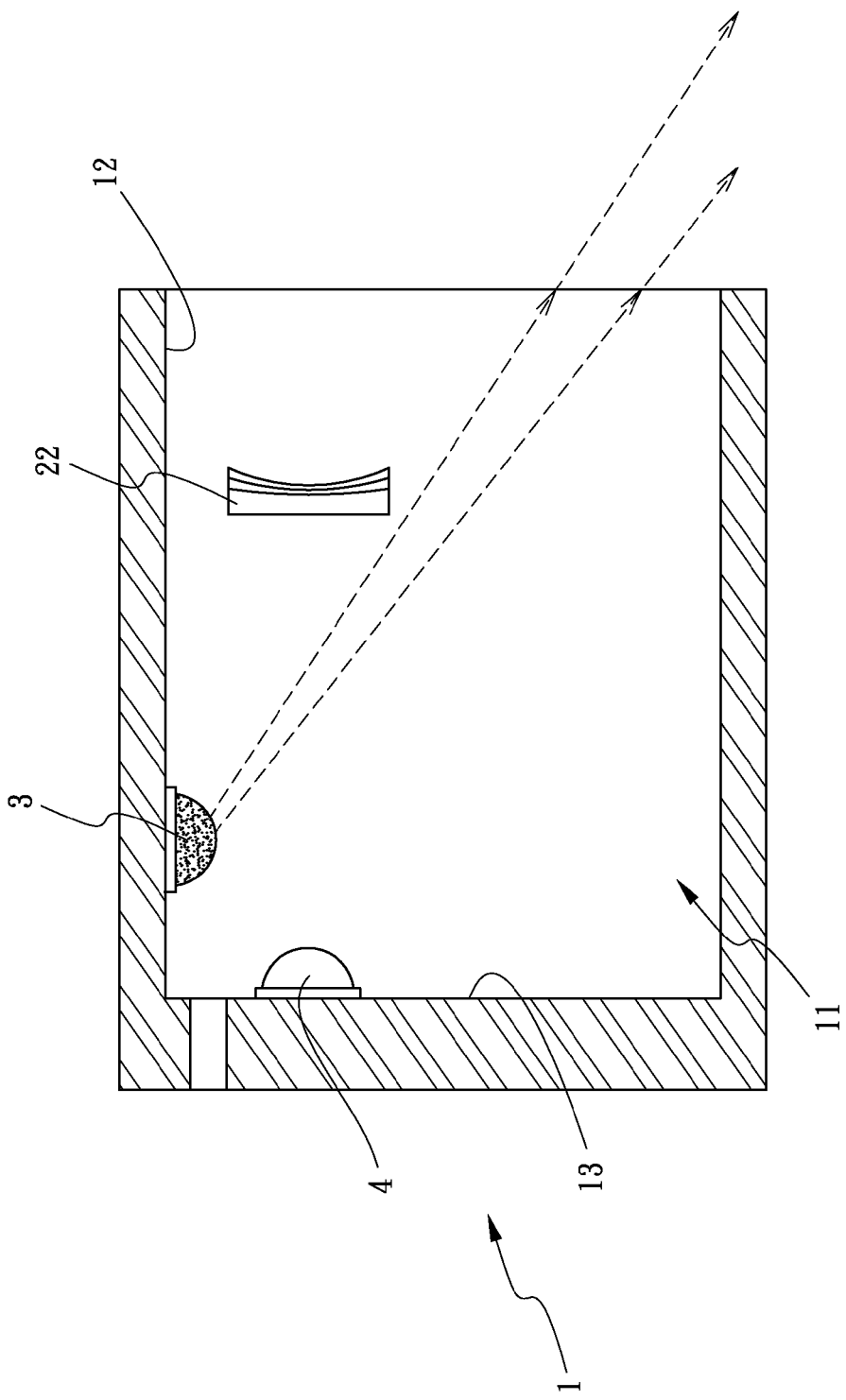
FIG. 8 is an embodied view of another embodiment of the present invention for showing a low beam condition.
Figure 9:
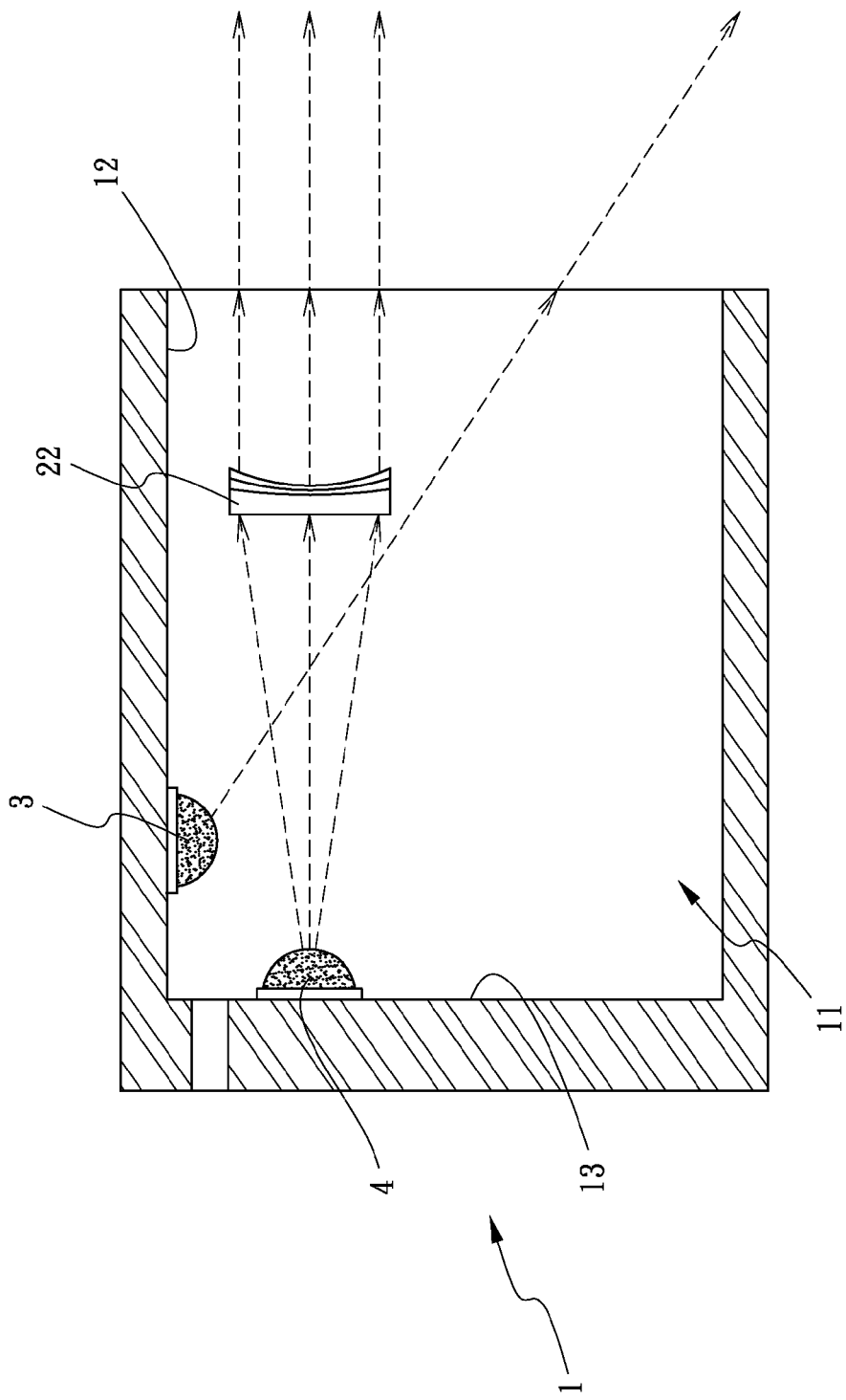
FIG. 9 is an embodied view of another embodiment of the present invention for showing a high beam condition.

2. As shown in FIGS. 7-9, another embodiment of the present invention, the lens 2 is a Fresnel lens 22.

3. As shown in FIG. 2, FIG. 5 and FIG. 8, an angle is defined between the first surface 12 and the second surface 13.

4. The downward light source 3 is perpendicular to the straight light source 4.

Figure 10:
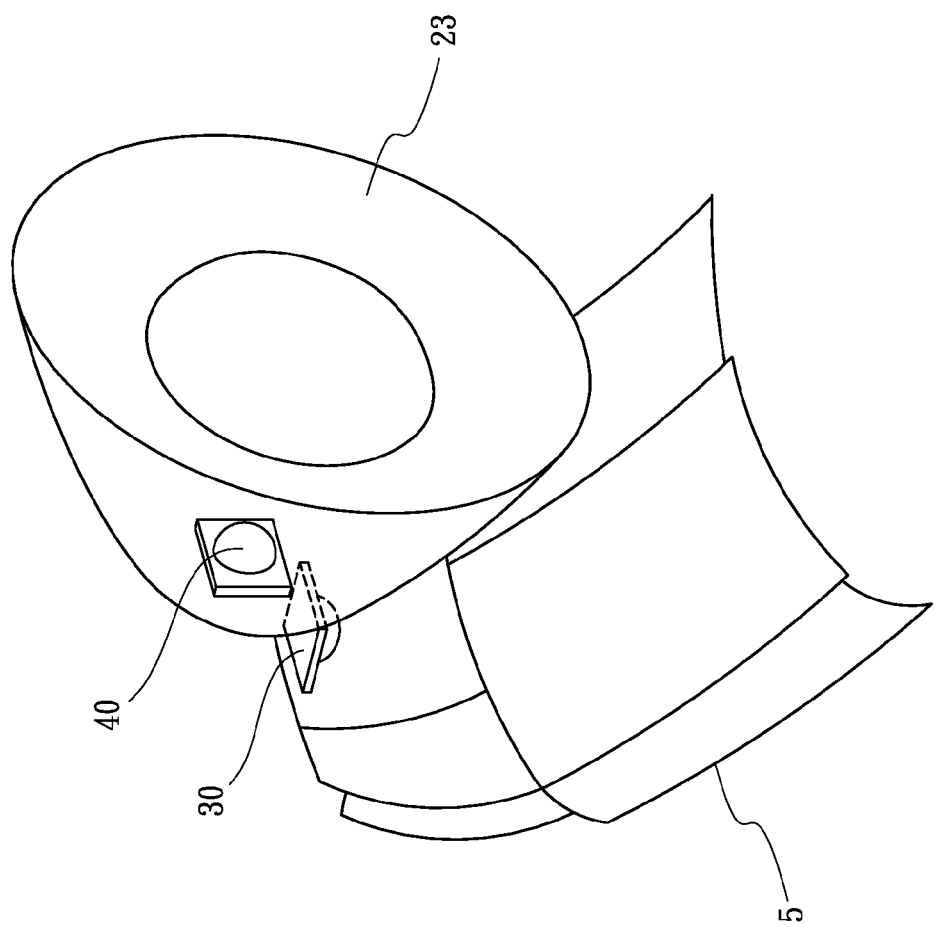
FIG. 10 is a perspective view of a further embodiment of the present invention in which the lens is a TIR lens.
Figure 11:
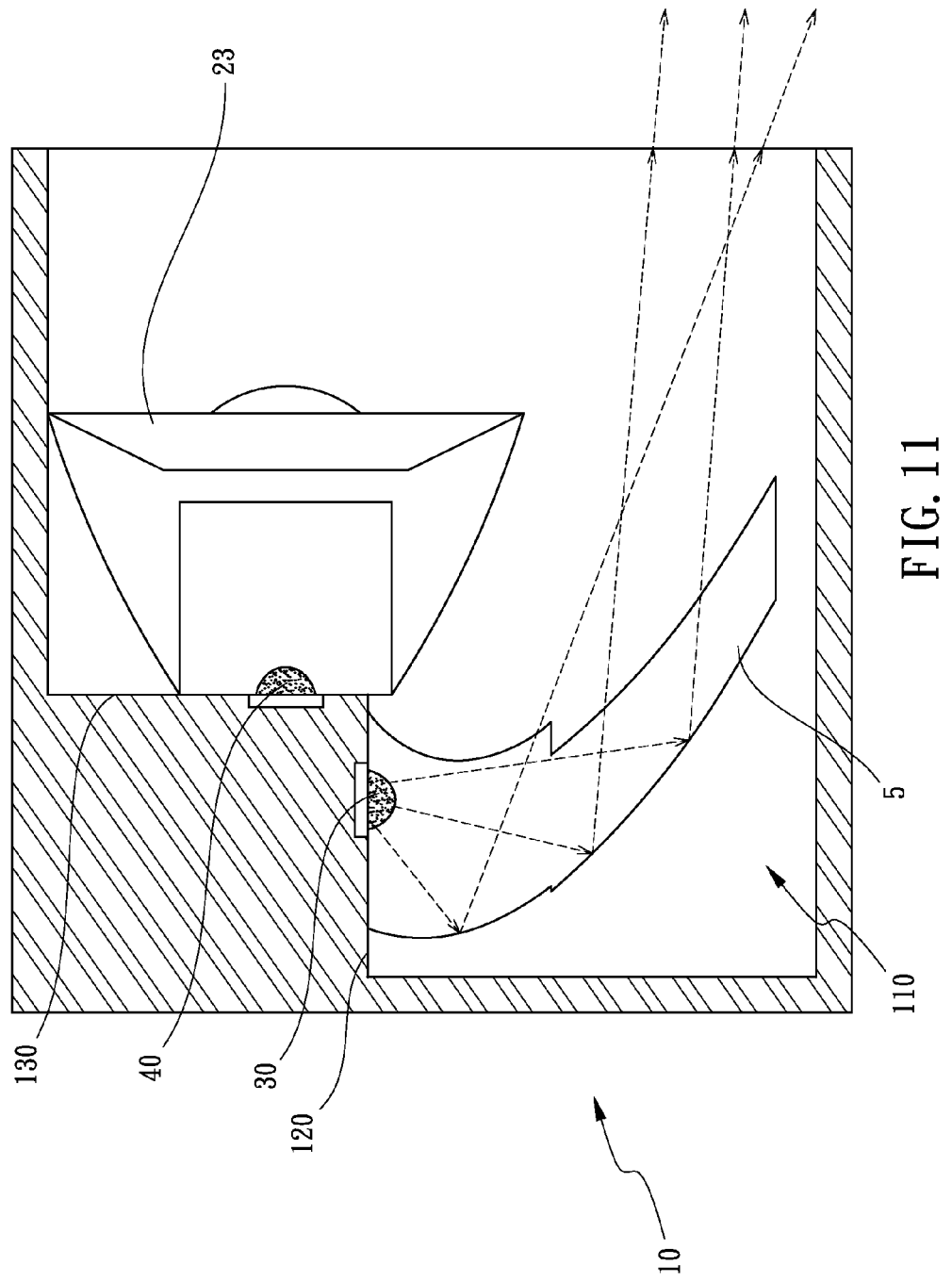
FIG. 11 is an embodied view of the further embodiment of the present invention for showing a low beam condition.
Figure 12:
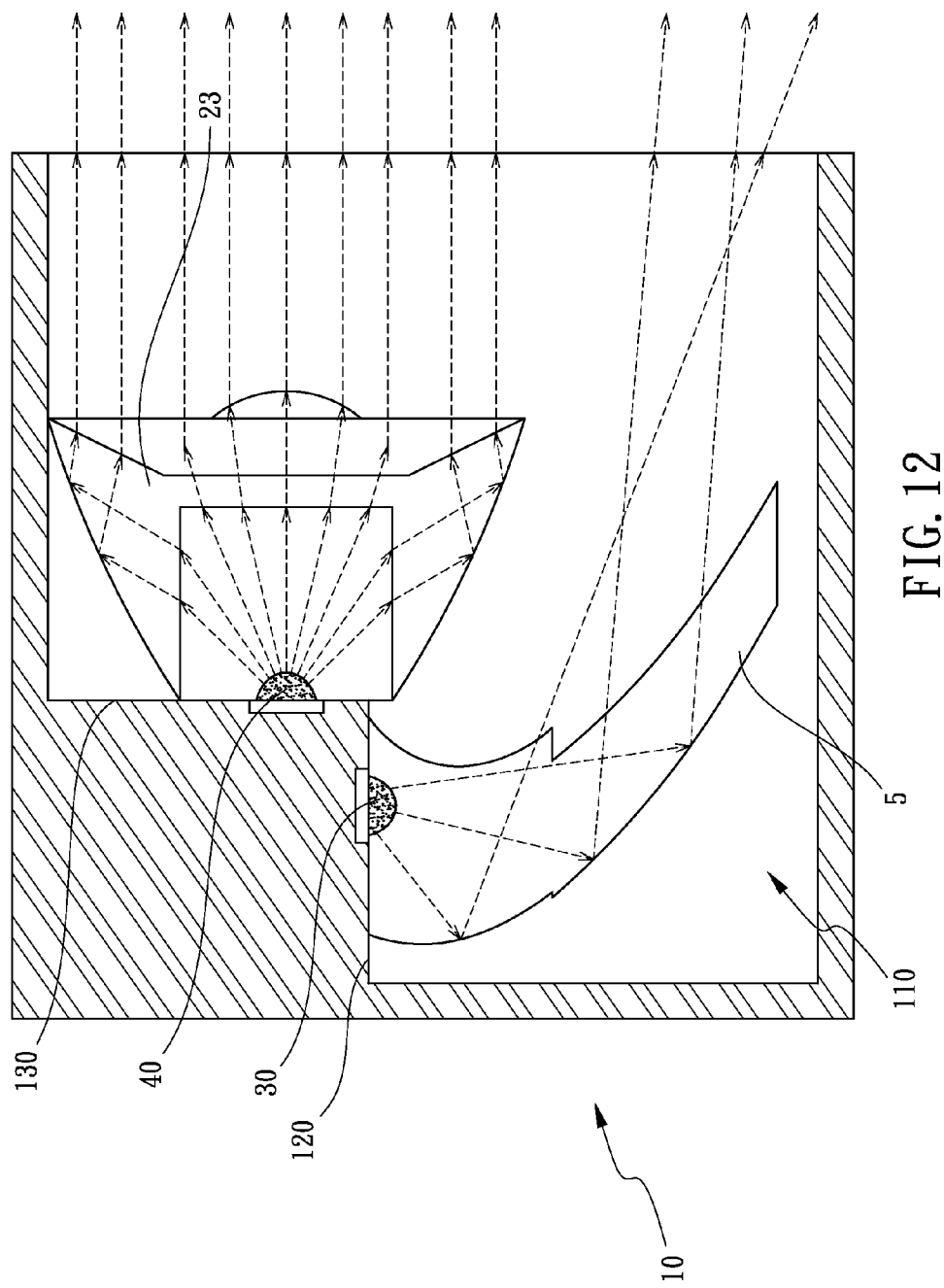
FIG. 12 is an embodied view of the further embodiment of the present invention for showing a high beam condition.

As shown FIGS. 10-12, a further embodiment of the present invention comprises a main body 10 having a receiving space 110 defined therein, a TIR lens (total internal reflection lens) 23, a downward light source 30 and a straight light source 40. The receiving space 110 has a reflecting plane 5 assembled therein. The reflecting plane 5 corresponds to the downward light source 30. Parts of light beam of the downward light source 30 obliquely pass through the receiving space 110, and rests of the light beam of the downward light source 30 are reflected by the reflecting plane 5 and pass through the receiving space 110 so as to form a low beam lighting region, as shown by the dashed lines and arrows in FIG. 11. As shown in FIG. 12, a plurality of the straight light source 40 passes through the TIR lens 23.

Figure 13:
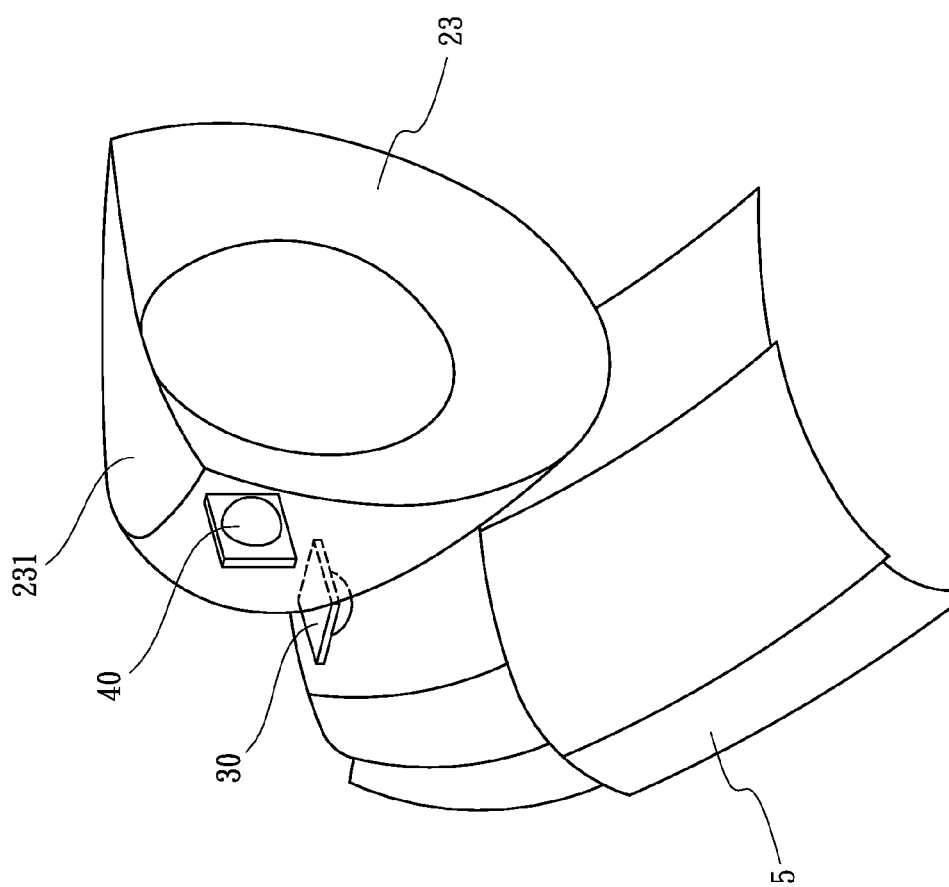
FIG. 13 is a perspective view of a further embodiment of the present invention in which the lens is a TIR lens.
Figure 14:
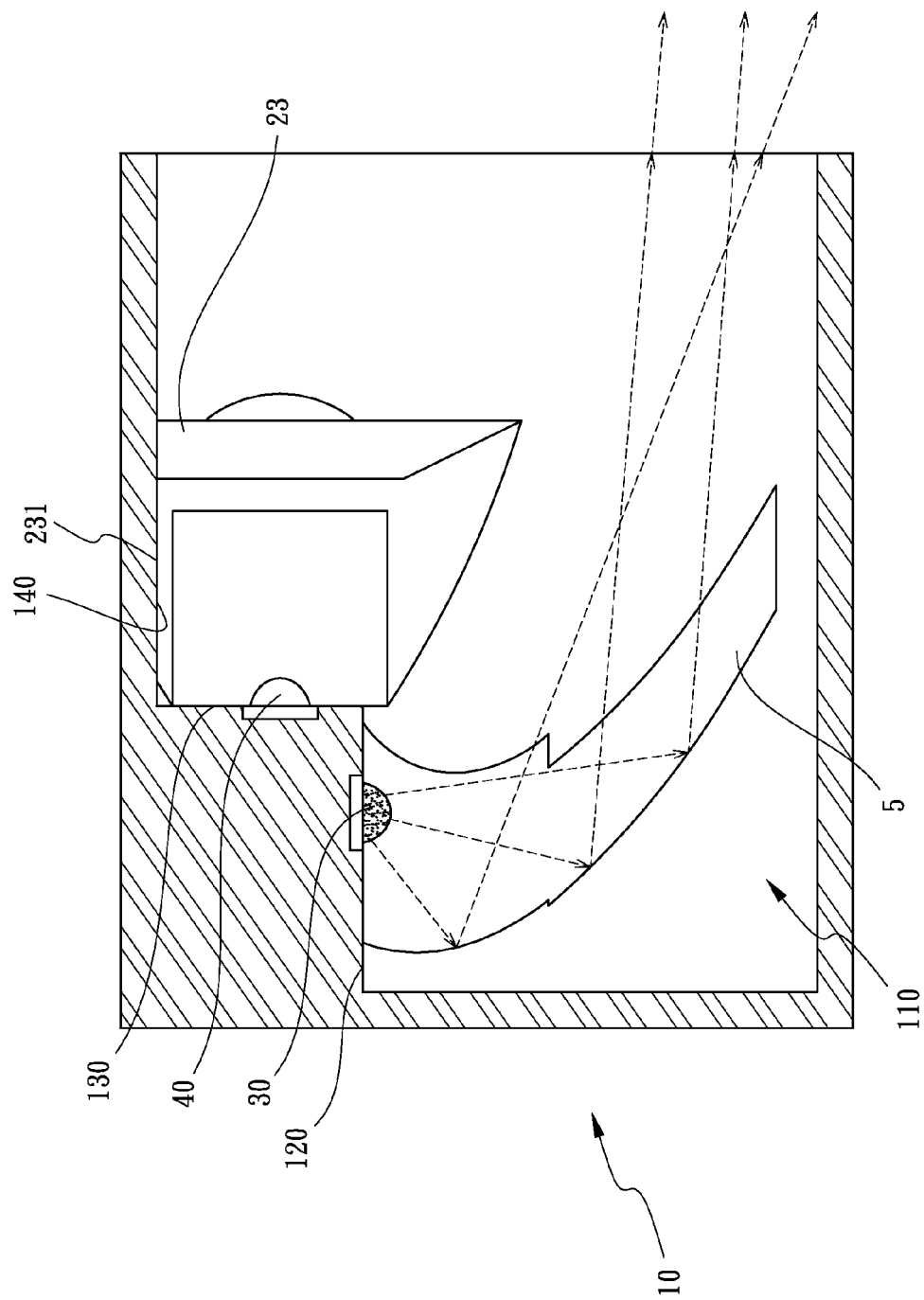
FIG. 14 is an embodied view of the further embodiment of the present invention for showing a high beam condition.
Figure 15:
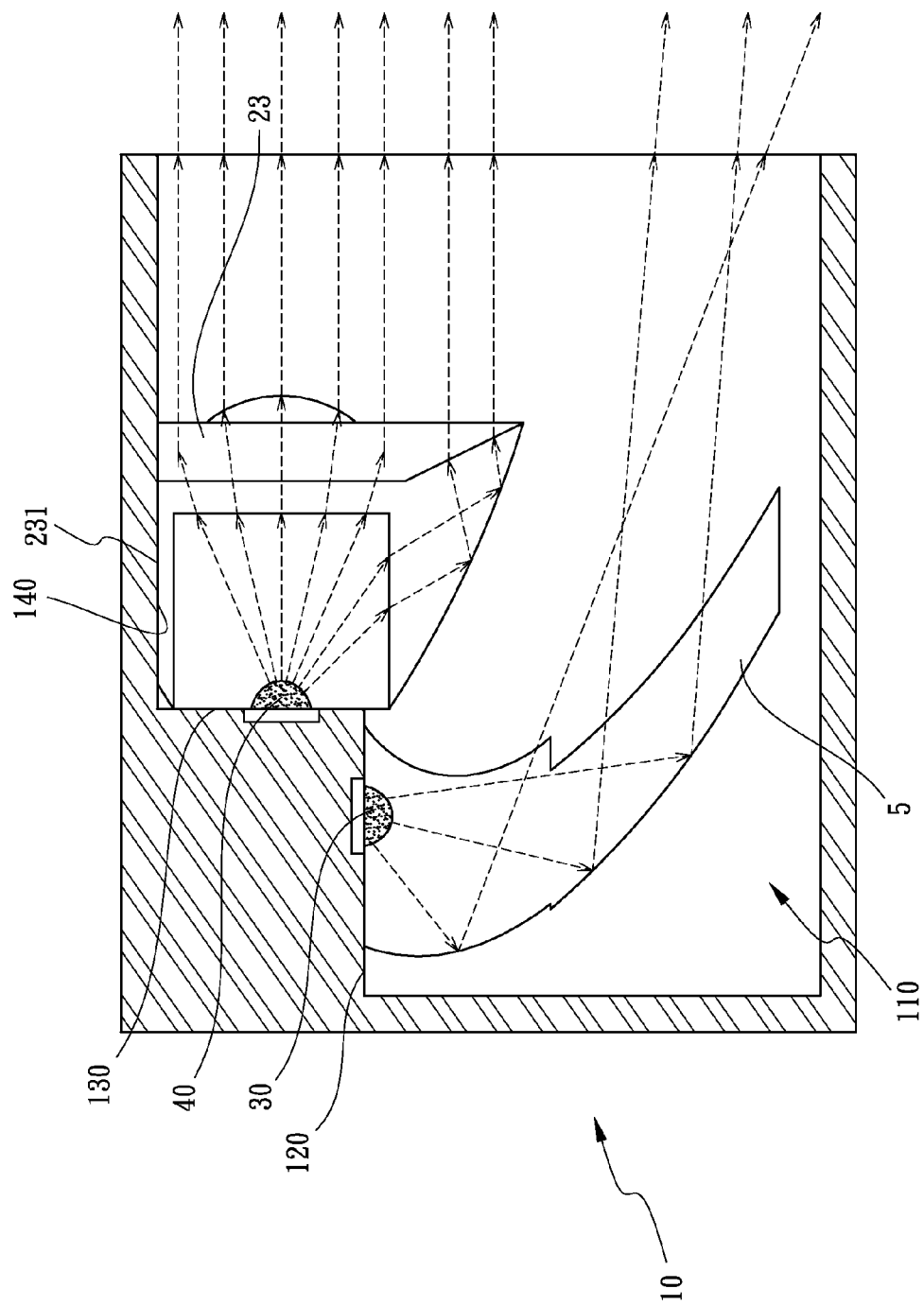
FIG. 15 is an embodied view of the further embodiment of the present invention for showing a high beam condition.

Referring to FIGS. 13-15, the TIR lens 23 further has a flat plane 231 formed at a lateral side thereof. The receiving space 110 has a third surface 140 defined therein. The flat plane 231 is assembled with the third surface 140. As compared with the TIR lens 23 shown in FIG. 11, a volume of an upper portion of the TIR lens 23 configured with the flat plane 231 is reduced so that the size of the main body 10 is reducible. In this embodiment, the angle between the first surface 120 and the second surface 130 is 270 degrees, and the angle between the second surface 130 and the third surface 140 is 90 degrees.

The lens 2 described in the present invention is targeted for an element in which a light beam passes through and projects forward. The types and the appearances of the lens 2 are not limited by the present invention.

The advantages of the present invention are described as following.

Firstly, the structure of the present invention is simple and sustainable under long-term operations.

Secondly, because the user does not need to adjust the distance between the light and the reflector or another distance between the light and the lens as described in prior arts, the present invention provides a suitable lighting condition according to the practical road conditions, so that the user operates the present invention easily.

Although the invention has been explained in relation to its preferred embodiment, it is to be understood that many other possible modifications and variations can be made without departing from the spirit and scope of the invention as hereinafter claimed.

What is claimed is:

1. A high beam and low beam combination lamp for a bicycle comprising a main body, a lens, a downward light source and a straight light source;
   the main body having a receiving space defined at one end thereof, the receiving space having a first surface and a second surface formed therein;
   the lens being assembled in the receiving space and corresponding to the second surface;
   the downward light source being assembled with the first surface of the receiving space, parts of the light beam of the downward light source obliquely passing through the receiving space so as to form a low beam lighting region; and
   the straight light source being assembled with the second surface, the light beam of the straight light source passing through the lens so as to form a high beam lighting region;
   wherein the high beam and low beam combination lamp is configured to be operable to a low beam condition where the downward light source is lighted, and a high beam condition where both the straight light source and the downward light source are lighted.

2. The high beam and low beam combination lamp for a bicycle as claimed in claim 1, wherein the lens is optionally selected as a plano-convex lens, a double convex lens or a Fresnel lens.

3. The high beam and low beam combination lamp for a bicycle as claimed in claim 1, wherein the lens is a TIR lens; the receiving space has a reflecting plane assembled therein; the reflecting plane corresponds to the downward light source; other parts of the light beam of the downward light source are reflected by the reflecting plane and pass through the receiving space so as to form a low beam lighting region.

4. The high beam and low beam combination lamp for a bicycle as claimed in claim 3, wherein the TIR lens further has a flat plane formed thereon; the receiving space has a third surface defined therein; the flat plane is assembled with the third surface.

5. The high beam and low beam combination lamp for a bicycle as claimed in claim 4, wherein the angle between the first surface and the second surface is 270 degrees; the angle between the second surface and the third surface is 90 degrees.

6. The high beam and low beam combination lamp for a bicycle as claimed in claim 1, wherein the downward light source and the straight light source are light-emitting diodes.

7. The high beam and low beam combination lamp for a bicycle as claimed in claim 1, wherein an angle is defined between the first surface and the second surface.

8. The high beam and low beam combination lamp for a bicycle as claimed in claim 7, wherein the angle defined between the first surface and the second surface is optionally selected as 90 degrees or 270 degrees.

* * * * *